United States Patent
Patwardhan et al.

(10) Patent No.: US 10,332,093 B2
(45) Date of Patent: Jun. 25, 2019

(54) MULTI-USE NEAR FIELD COMMUNICATION FRONT END ON A POINT OF SALE SYSTEM

(71) Applicant: Clover Network, Inc., Sunnyvale, CA (US)

(72) Inventors: Ketan Patwardhan, Sunnyvale, CA (US); Narayanan Gopalakrishnan, Newark, CA (US); Victor Pan, Fremont, CA (US); James Castillo, Mountain House, CA (US)

(73) Assignee: Clover Network, Inc., Sunnyvale, CA (US)

( * ) Notice: Subject to any disclaimer, the term of this patent is extended or adjusted under 35 U.S.C. 154(b) by 0 days.

(21) Appl. No.: 15/698,462

(22) Filed: Sep. 7, 2017

(65) Prior Publication Data

US 2019/0073653 A1    Mar. 7, 2019

(51) Int. Cl.
| | |
|---|---|
| *G06Q 20/00* | (2012.01) |
| *G06Q 20/20* | (2012.01) |
| *H04B 5/00* | (2006.01) |
| *G06K 7/10* | (2006.01) |
| *G06Q 20/38* | (2012.01) |
| *G06Q 20/32* | (2012.01) |

(52) U.S. Cl.
CPC ....... *G06Q 20/208* (2013.01); *G06K 7/10297* (2013.01); *G06Q 20/3278* (2013.01); *G06Q 20/3829* (2013.01)

(58) Field of Classification Search
None
See application file for complete search history.

(56) References Cited

U.S. PATENT DOCUMENTS

| | | | |
|---|---|---|---|
| 8,924,260 B1* | 12/2014 | Priebatsch | G06Q 20/20 705/16 |
| 9,721,242 B2* | 8/2017 | Bedier | G06Q 20/204 |

(Continued)

FOREIGN PATENT DOCUMENTS

CN     201681407 U    12/2010

OTHER PUBLICATIONS

NXP Semiconductors, Product Data Sheet, CLRC663, High Performance Multi-Protocol NFC Frontend, Rev 4.4, May 2, 2017.

(Continued)

*Primary Examiner* — Ariel J Yu
(74) *Attorney, Agent, or Firm* — Daylight Law, P.C.

(57) ABSTRACT

Methods and systems related to near field communication (NFC) front ends for point of sale terminals are disclosed. One point of sale system includes an NFC front end communicatively coupled to an antenna, a discrete microcontroller (DM) communicatively coupled thereto, and an applications microprocessor (AP) communicatively coupled to the DM. The DM stores a first software stack for a first NFC protocol, a second software stack for a second NFC protocol, and instructions to process a digitized NFC signal from the NFC front end with the first software stack. The AP stores instructions to instantiate an operating system for the point of sale system, instantiate a master NFC service, and transmit a remote procedure call from the master NFC service to the DM to switch between the first software stack and the second software stack.

22 Claims, 8 Drawing Sheets

(56) References Cited

U.S. PATENT DOCUMENTS

| | | |
|---|---|---|
| 2008/0238610 A1* | 10/2008 | Rosenberg .............. G06Q 20/20 |
| | | 340/5.7 |
| 2011/0320293 A1 | 12/2011 | Khan |
| 2012/0254031 A1 | 10/2012 | Walker |
| 2013/0040571 A1 | 2/2013 | Wall |
| 2014/0027506 A1 | 1/2014 | Heo |
| 2014/0052532 A1 | 2/2014 | Tsai |
| 2015/0118958 A1* | 4/2015 | Jain ...................... G06Q 20/204 |
| | | 455/41.1 |
| 2016/0125376 A1 | 5/2016 | Beatty |
| 2016/0260073 A1* | 9/2016 | Colnot ................. G06Q 20/202 |
| 2016/0275472 A1* | 9/2016 | Rajamannar .......... G06Q 20/204 |
| 2016/0358159 A1 | 12/2016 | Khan |

OTHER PUBLICATIONS

NXP, Products, NFC Front End Solutions, Available at: http://www.nxp.com/products/identification-and-security/nfc-and-reader-ics/nfc-frontend-solutions:MC_41960 (Accessed on: Aug. 30, 2017).
Extended European Search Report for EP Patent Application No. 18193126.2, dated Nov. 14, 2018.
NXP Semiconductors N.V., Application Note, AN11906, Starting a Product Development with PN518, Rev. 1.0, Jan. 4, 2017.
NXP, Application Note, AN11802, NFC Reader Library for Linux Installation Guidelines, Rev. 1.4, May 16, 2017.

\* cited by examiner

400

MULTI-USE NEAR FIELD COMMUNICATION FRONT END ON A POINT OF SALE SYSTEM

BACKGROUND

The term near field communication (NFC) refers to a type of communication that involves minute wireless data transfers between devices over limited distances. The technology is rooted in radio-frequency identification technology (RFID). NFC does not refer to a single communication specification as numerous incompatible platforms have been developed in the NFC space. These specifications include those developed by ISO/IEC, the NFC Forum, the GSMA Group, the EMV Company, and others. Furthermore, each NFC platform can include multiple modes of communication that are each individually practiced by separate devices. For example, one device could execute the NFC Forum Reader/Writer mode but not the NFC Forum Peer-to-Peer mode. The resulting technology landscape can be confusing to people who expect a device that engages in NFC communication to be able to communicate with any other device that uses NFC. However, this is not the case, and enabling a device to be interoperable with two different NFC platforms can be technically challenging.

SUMMARY

This disclosure relates to point of sale (POS) devices capable of obtaining payment information from an NFC enabled device, encrypting the payment information, and transmitting the payment information to a central processor for payment. Specifically, this disclosure relates to POS devices that can communicate via multiple NFC specifications using a single NFC front end. One of the NFC specifications can be used to obtain payment information that is processed by a first secure microprocessor while another one of the NFC specifications is used to obtain unsecure information that is processed by an applications microprocessor. Benefits associated with some of the disclosed approaches include the reduced bill of materials and design effort resulting from a reduction in the number of antennas and front-end hardware required by a single POS device, and the improved user experience associated with a device that conducts all NFC communications via a single location on the device. This disclosure includes specific technical approaches directed to enabling a POS device to communicate using multiple NFC protocols with a single NFC front end.

FIG. 1 illustrates a POS device 100 with an integrated NFC antenna 101. The POS device 100 also includes a printed circuit board 102 with an NFC controller 103 and a discrete microcontroller 104. As illustrated, POS device 100 is displaying a prompt on display 105 indicating that the terminal is primed to receive payment information via NFC antenna 101. In response to such a prompt, a customer of the merchant operating the terminal could transmit payment information to NFC antenna 101 by holding an NFC-enabled payment card 106, with an NFC antenna 107, above POS device 100. The payment information could be transmitted in accordance with the EMVCo L1 NFC specification. The POS device may be equipped to read many different NFC cards for purposes of processing payments. However, POS device 100 can also, with the same hardware elements, communicate with another NFC device using a completely different specification. For example, POS device 100 could communicate with a store card 108 with an NFC antenna 109 using a less secure NFC protocol such as that defined by the NFC Forum Reader/Writer specification. POS device 100 can therefore obtain payment information from NFC enabled payment cards using NFC as well as communicate with low-cost NFC tags.

Approaches disclosed herein include the use of a discrete microcontroller that can selectively instantiated one of at least two different NFC stacks, where each NFC stack is tailored for a specific use. The discrete microcontroller communicates with both an NFC front end and an applications microprocessor for the POS device. The POS device operates in two different modes depending upon which of the two different NFC stacks is instantiated. The POS device can engage in communication with two different external devices via NFC using two incompatible and independent NFC protocols in the two modes. However, switching between the two modes does not require any change in the hardware along the path of communication between the external device and the applications microprocessor, and instead all that is involved is a change in the impedance of solid state devices and the use of different software.

In certain approaches, the discrete microcontroller can selectively instantiate a first NFC stack for an NFC payment processing protocol and a second NFC stack is for a less secure protocol. The terminal could be referred to as being in a payment processing mode when the first NFC stack was instantiated. In these approaches, the discrete microcontroller can also serve as a secure microprocessor for the POS device and can encrypt payment information received via the NFC front end and payment processing NFC protocol for transmission to a payments processor. The discrete microcontroller can also encrypt payment information received on the POS device from other channels such as from a contact chip card reader, a magnetic stripe reader, a personal identification number pad, an integrated touch screen, or any other channel for receiving payment information. The discrete microcontroller can also serve as the payments kernel for the POS device. In these approaches, the discrete microcontroller can be transparent to an operating system on the applications microprocessor and can tunnel data from the NFC front end to the applications microprocessor while the second stack is instantiated and the terminal is in an unsecure mode, and can receive and encrypt payment data from the NFC front end while the first stack is instantiated and the terminal is in the payment processing mode.

In certain approaches, the discrete microcontroller is rendered transparent to an NFC service on the applications microprocessor by augmenting an operating system of the applications microprocessor with a master communication service that administrates interrupts between the two NFC stacks, and sends remote procedure calls to retrieve buffered data on the discrete microcontroller. The NFC service of the operating system can be modified slightly to interoperate with the master communication service but the core of the operating system does not need to be modified.

In one approach, a POS system an NFC front end communicatively coupled to an antenna, a discrete microcontroller communicatively coupled with the near field communication front end, and an applications microprocessor communicatively coupled with the discrete microcontroller. The discrete microcontroller stores a first software stack for a first NFC protocol, and a second software stack for a second NFC protocol. The applications microprocessor instantiates an operating system for the POS system and a master NFC service. The discrete microcontroller is programmed to, selectively and in response to the master NFC service, instantiate: (i) the first software stack exclusive to the second software stack; and (ii) the second software stack exclusive to the first software stack. The first and second software stacks are independent. The first NFC protocol and the second NFC protocol are different and incompatible.

In another approach, a method of operating a POS system includes storing a first software stack for a first NFC protocol on a discrete microcontroller, storing a second software stack for a second NFC protocol on the discrete microcontroller, instantiating an operating system for the POS system on an applications microprocessor, instantiating a master NFC service on the applications microprocessor, and digitizing an NFC near field communication signal using an NFC front end. The method also includes, selectively processing, on the discrete microcontroller and as selected by the master NFC service, the digitized NFC signal with one and only one of the first software stack and the second software stack. The operating system controls the NFC front end solely via the master NFC service. The first NFC protocol and the second NFC protocol are different and incompatible.

In another approach, a POS system includes an NFC front end communicatively coupled to an antenna, a discrete microcontroller communicatively coupled thereto, and an applications microprocessor (applications processor) communicatively coupled to the discrete microcontroller. The discrete microcontroller stores a first software stack for a first NFC protocol, a second software stack for a second NFC protocol, and instructions to process a digitized NFC signal from the NFC front end with the first software stack. The applications processor stores instructions to instantiate an operating system for the point of sale system, instantiate a master NFC service, and transmit a remote procedure call from the master NFC service to the discrete microcontroller to switch between the first software stack and the second software stack.

DETAILED DESCRIPTION

Figure 1:
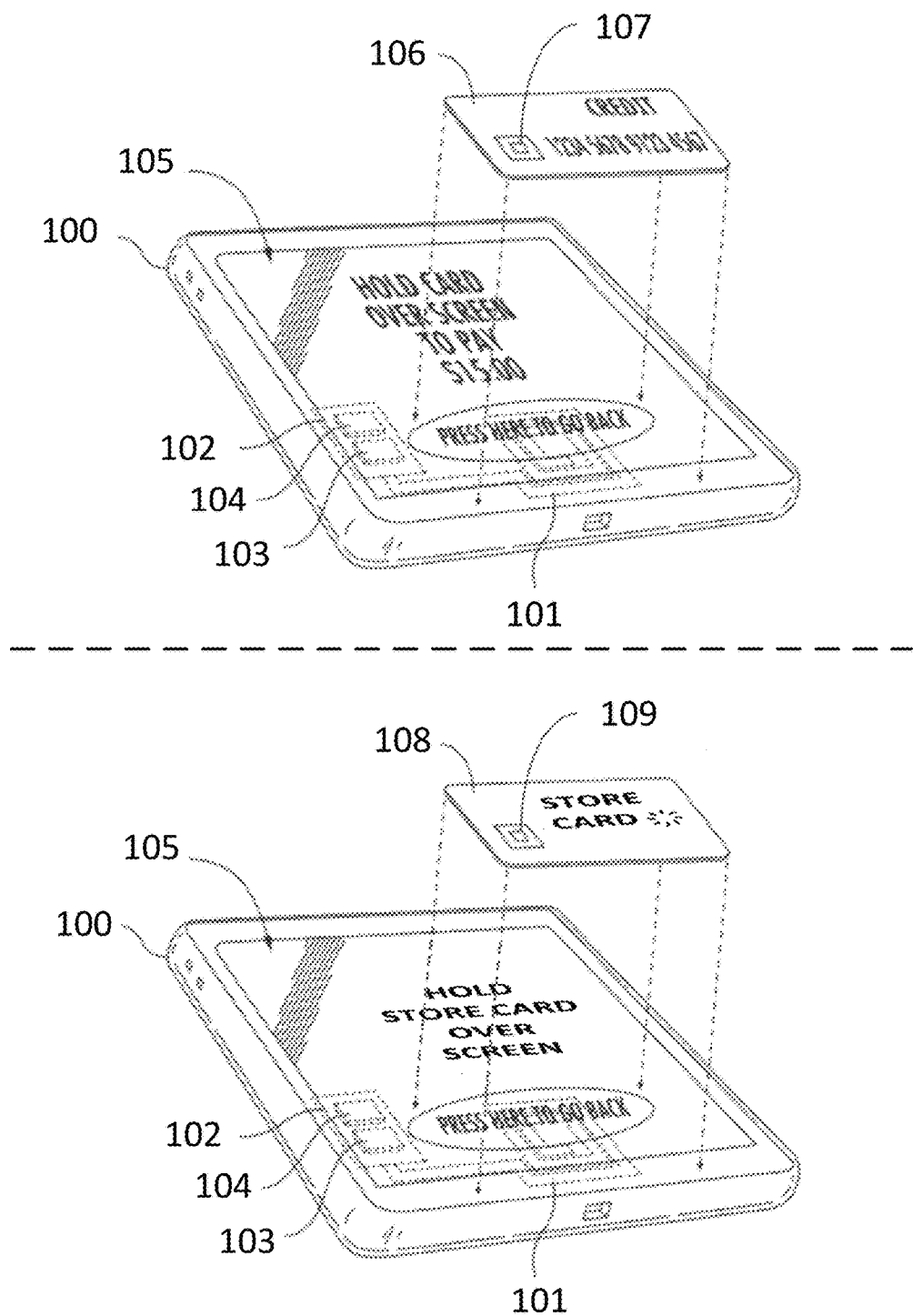
FIG. 1 illustrates a point of sale (POS) device that can communicate with both a payment card and a near field communication (NFC) tag using a single NFC frontend in accordance with some of the disclosures herein.

Methods and systems for multi-use near field communication (NFC) front ends are disclosed. An NFC front end receives signals from an antenna and conducts initial processing on the signals to condition them for use by a host system. Generally, an NFC front end includes an analog interface for connecting to an antenna (e.g., a modulator/demodulator, a phase locked loop, a filter, a transmitter, a receiver, an oscillator, an analog-to-digital converter, etc.), and a bus interface for connecting to a host (e.g., a USB, UART, SPI, or I$^2$C interface). An NFC front end can be implemented in a single integrated circuit with external connections to connect the analog interface to an external antenna, and the bus interface to an external bus. In accordance with the following approaches a single NFC front end can be used for different and incompatible NFC protocols. In particular, one of the protocols can be an NFC payment processing protocol and one of the protocols can be a basic or less secure NFC communication protocol. In further accordance with some of the following approaches, the same hardware can be used to receive payment information data from the NFC antenna of a POS system for secure processing, and tunnel other data from that same NFC antenna to an applications microprocessor of the POS system.

Approaches disclosed herein include the use of a discrete microcontroller that can selectively instantiate one of at least two different NFC stacks, where each NFC stack is tailored for a specific use. The NFC stacks can be independent software stacks. The NFC software stacks can be referred to as independent because they exist wholly in mutually exclusive physical memory locations and can individually be used to implement their protocols. As used herein, a protocol "stack" refers to a set of computer readable instructions and associated data that can be utilized by a computer to implement a low-level driver and an associated state machine which will allow the computer to talk to a different computer that operates the protocol. The discrete microcontroller can be configured such that it stores two protocol stacks in an internal or external nonvolatile memory, and instantiates a first software stack exclusive to a second software stack by loading the first software stack from memory and vice versa. The internal memory could be a nonvolatile memory such as a flash memory of the discrete microcontroller. The external memory could be a discrete flash memory on the same printed circuit board as the discrete microcontroller. The protocol stack can be instantiated on the discrete microcontroller using a bootloader or BIOS. The protocol stack could also be instantiated on the discrete microcontroller using a higher-level system, including a micro-operating system of the discrete microcontroller. The software stacks could facilitate communication protocols that utilize the same frequency when transmitting through the air between two devices. Indeed, such approaches would be beneficial in that the hardware of the NFC front end would not need to be overtly modified to facilitate communication in either mode and could be implemented with a static hardware configuration. The discrete microcontroller could selectively and alternatively instantiate either software stack to communicate in accordance with the related protocol. The discrete microcontroller could also initialize the NFC front end to be compatible with a specific NFC protocol such as by sending a signal to tune the antenna or filters of the NFC front end.

The discrete microcontroller and NFC front end can be components of a larger system. The system can be said to be operating in different "modes" when the discrete microcontroller and NFC front end are being used to process signals in accordance with different NFC protocols. In specific approaches, the discrete microcontroller could be a component of a POS system. For example, the discrete microcontroller could be a secure microprocessor for the POS system. The secure microprocessor could store encryption keys to encrypt payment information received by the POS system. The secure microprocessor could also implement a secure kernel for the POS system. The encryption keys could be stored in a secure memory on the secure microprocessor which is configured to delete the encryption keys in case of a tamper detector indicating that the POS system was undergoing a malicious physical attack. The secure microprocessor could be covered by a secure mesh to prevent and detect tampering with the secure microprocessor. In a payment processing mode, payment information could be received by the NFC antenna and secure microprocessor using an NFC payment processing protocol. In an alternative mode, unsecure information could be received by the NFC antenna and secure microprocessor using a basic NFC communication protocol. The NFC payment processing protocol could be the EMV Co L1 protocol. The basic NFC communication protocol could be an NFC Forum protocol.

In specific approaches, the disclosed hardware configuration and methods of operation will facilitate EMV compliance for the POS system because the software stack and library associated with the EMV Co L1 protocol can be stored on the discrete microcontroller in an unmodified form. As the two or more stacks on the discrete microcontroller are fully independent, and the POS system is configured to instantiate the stacks in a mutually exclusive manner, they do not need to be changed to accommodate the use of another protocol even though they both use the same front end. As will be described below, the handoff between the protocols can also be handled by a higher-level system and can be completely transparent to the two stacks. Therefore, one stack can be independently modified while another stack can remain in a certified state as recorded by a third party, such as EMV Co., and loaded into the discrete microcontroller. For example, a new updated NFC Forum Reader/Writer library drop could be integrated into the POS system without affecting a separate payment processing stack.

Figure 2:
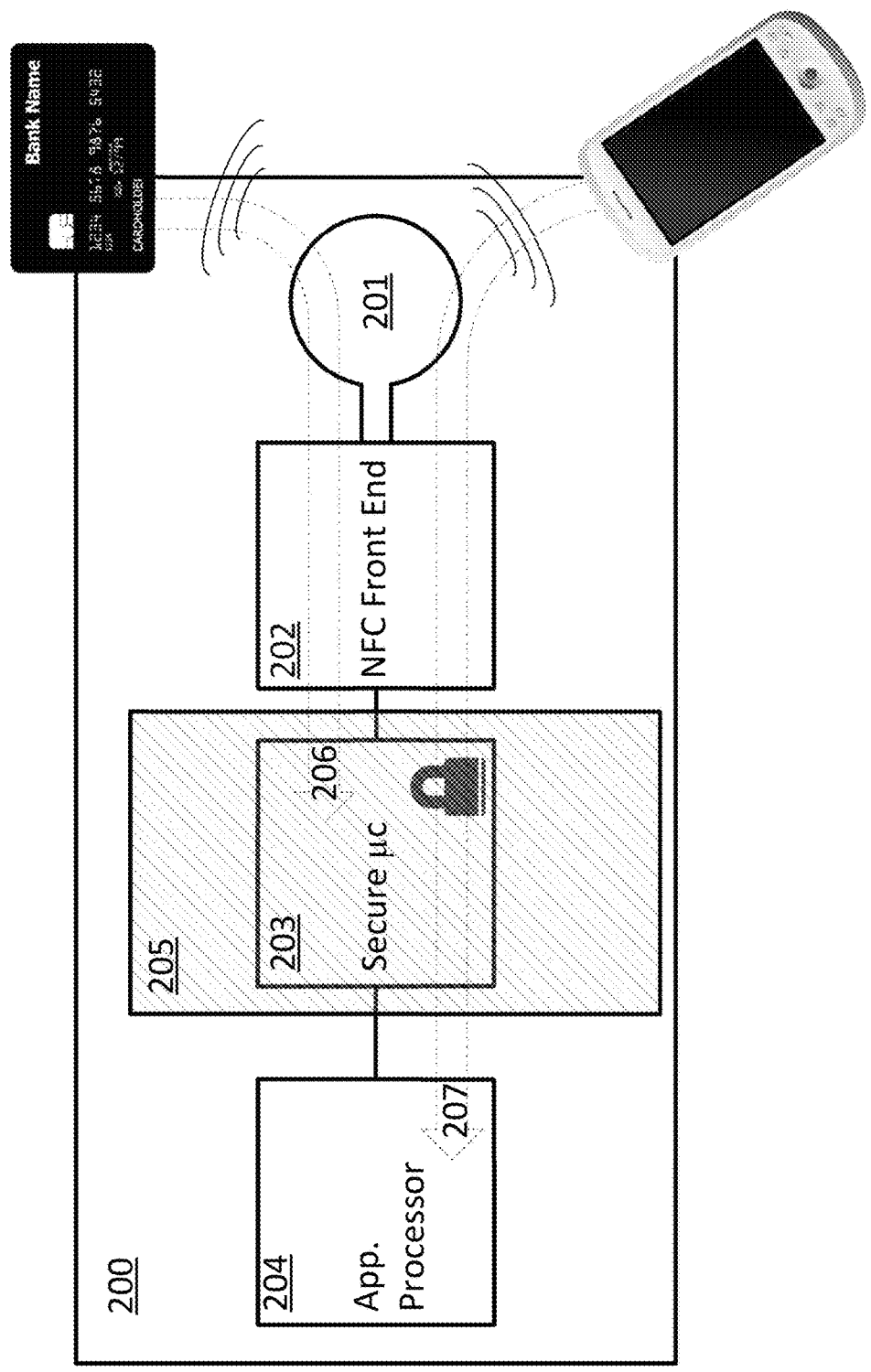
FIG. 2 illustrates a block diagram of a set of components in a POS device that uses a single NFC front end for two incompatible NFC protocols.

FIG. 2 is a block diagram 200 of the components of a POS system that utilizes a single NFC front end for two or more different NFC communication protocols. Block diagram 200 includes an antenna 201, an NFC front end 202, a discrete microcontroller 203, and an applications microprocessor 204. As illustrated, the discrete microcontroller 203 includes a secure microprocessor for the POS system and it is located within a tamper mesh 205. The antenna 201 and NFC front end 202 can communicate with devices that operate incompatible NFC protocols. In certain approaches, the incompatible NFC protocols that the system is designed to facilitate will be selected from a set that utilizes the same frequency as they are transmitted through the air. More generally, the protocols could still be incompatible at the physical level of the OSI model, but could utilize physical electromagnetic signals of roughly the same major characteristic. Benefits accrue to these approaches in that the hardware implementation of NFC Front End 202 and antenna 201 can be static regardless of which mode the POS system is operating in. In certain approaches, the antenna and front end can be electrically tuned for a given mode, but will remain in a static hardware configuration. Discrete microcontroller 203 can instantiate one of at least two NFC stacks and tune NFC Front End 202 to communicate with the various devices. The stacks can be instantiated by loading the stacks from nonvolatile memory into RAM. The process for loading a stack, such as the EMV Co L1 stack, from nonvolatile memory into RAM can be as fast as a few hundred milliseconds. Therefore, even in the situation where the appropriate stack is not currently instantiated when it is needed by a customer, the time it takes to instantiate the stack is negligible compared to an acceptable level of latency for a typical customer point of sale experience involving NFC.

Discrete microcontroller 203 can selectively instantiate a first software stack for a first NFC protocol or a second software stack for a second NFC protocol. The two stacks can be instantiated exclusive to the alternative stack. While instantiating either stack, discrete microcontroller 203 could buffer data received from NFC Front End 202 until applications microprocessor 204 requested the data. The first protocol could be for an NFC payment processing protocol and the second could be a less secure or basic NFC communication protocol such as an NFC tag reader protocol. In such situations, discrete microcontroller 203 could additionally encrypt payment information received from the NFC Front End 202 before sending it on to applications microprocessor 204, or sending it to a payment processor directly. The encryption process could involve the use of payment keys such as those generated by a DUKPT key management scheme. As such, discrete microcontroller 203 could store a DUKTP key set and could also store additional keys or certificates. Discrete microcontroller could include a secure kernel for all the computation and functionality provided by the POS system. Discrete microcontroller 203 could be configured to delete the keys and certificates if tamper mesh 205 was disrupted or any other sensor in the system indicated that a tamper had occurred.

Applications microprocessor 204 could be the master processor of the POS system. Applications microprocessor 204 could instantiate an operating system, such as an Android Operating System or an equivalent, and run applications with the operating system such as a main register application for the POS system. The operating system could include services such as an NFC service. If the operating system were Android, the NFC service could be the Android NFC service. Applications microprocessor 204 could also instantiate a master NFC service. The master NFC service could be instantiated using firmware. The firmware could be loaded using a BIOS or bootloader. The firmware could be loaded from an internal or external nonvolatile memory.

The master NFC service could render discrete microcontroller 203 transparent to the operating system of applications microprocessor 204 by handling the transitions between the various NFC operating modes for the operating system and allowing the discrete microcontroller to tunnel data to the applications processor when the POS system is operating in an unsecure mode. The master NFC service could achieve this with the use of direct communication with both the NFC service of applications microprocessor 204 and the kernel or operating system of discrete microcontroller 203. Direct communication could be utilized to accept commands from and deliver data to the NFC service and to provide commands to and deliver data to and from the discrete microcontroller. The discrete microcontroller 203 could selectively instantiate one of its stored software stacks in response to the master NFC service.

The two arrows overlying the components of FIG. 2 illustrate the flow of data through the diagram in two modes of operation for the POS system. In a payment processing mode, data flows from a device having payment information, such as the illustrated NFC-enabled payment card, along data flow line 206. In an alternative or unsecure mode, data flows from a device having less sensitive information for transmission, such as the illustrated smartphone in NFC-tag emulation mode, along data flow line 207. The smartphone could include an application used to track loyalty points or some other non-payment related application that interacts with a point of sale system. Data flow line 206 could include processing on discrete microcontroller 203 using an NFC payment processing protocol after discrete microcontroller 203 had instantiated a first software stack for that protocol. The processed payment data could then be encrypted on the discrete microcontroller 203 and subsequently sent to applications microprocessor 204 for transmission through a network to a payments processor, or directly to the payments processor via a direct network connection to discrete microcontroller 203. Data flow line 207 could include processing on discrete microcontroller 203 using a basic NFC communication protocol using the second software stack. The processed information could then be tunneled to the applications microprocessor 204.

The switch over required for the POS system to facilitate data flow line 206 as opposed to data flow line 207 could be limited to a change in which software stack was instantiated by discrete microcontroller 203. In certain approaches, the switch could also involve a nominal change in NFC Front End 202 and antenna 201 such as electrically tuning the filter or changing the impedance of solid state devices in either block of the diagram.

The connections between the blocks in block diagram 200 are illustrated as generic single line connections. As illustrated, discrete microcontroller 203 could be connected to NFC front end 202 using a single connection such as a USB, SPIO, UART, or I²C bus. However, the communication can occur on multiple lines between the blocks. For example, applications processor 204 and discrete microcontroller 203 could be connected using two separate external buses such as a USB line and a UART line. Based on the application running on applications microprocessor 204, one of the lines could entirely block the other line such that the two elements in the block diagram were connected by two totally separate channels. However, the connection between applications processor 204 and discrete microcontroller 203 could also be provided via a single channel.

Communication between the applications microprocessor 204, discrete microcontroller 203, and NFC front end 202 could be conducted through external buses. The buses could be wires or traces on a printed circuit board. The external buses could route signals between the devices such that the devices were thereby communicatively coupled. Communications between applications microprocessor 204 and discrete microcontroller 203 could be conducted using inter-processor lines. Discrete microcontroller 203 could include a buffer for temporarily storing data that is meant to be tunneled through to applications microprocessor 204 until applications microprocessor 204 sends a request for the data. All of the devices in block diagram 200 could be located on the same printed circuit board and all inter-block lines could be provided by traces on that printed circuit board. Furthermore, the difference between data flow path 206 and the portion of data flow path 207 that terminates at discrete microcontroller 203 can involve the same physical routing at the board or system level of the diagram.

Figure 3:
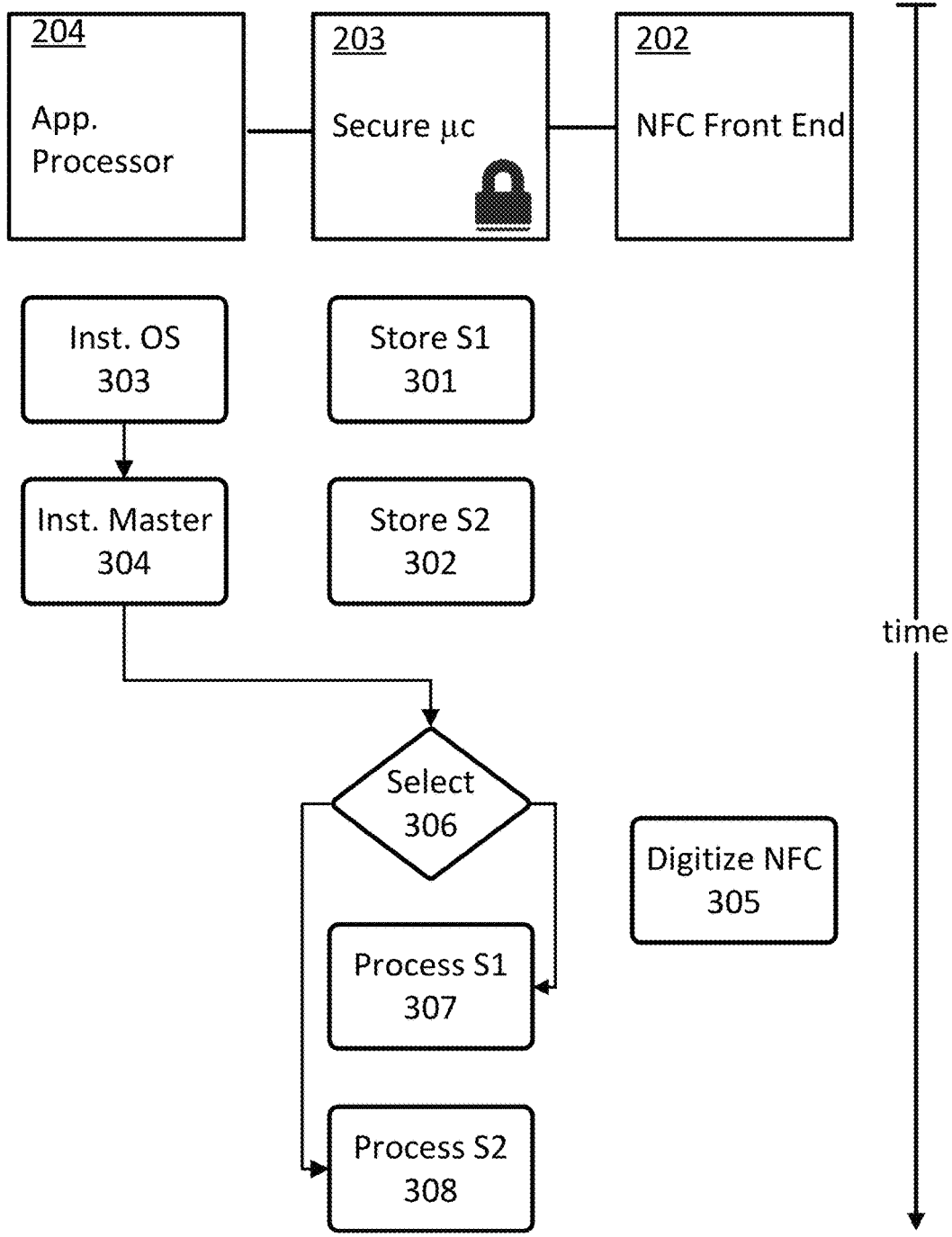
FIG. 3 illustrates a flow chart for a set of methods that allow a POS device to communicate using two different NFC protocols using a single NFC front end.

FIG. 3 includes a flow chart 300 of a set of methods for operating a POS system that uses a single NFC front end for at least two NFC protocols. The methods are disclosed with reference to the POS components of FIG. 2. Steps located below a POS component in FIG. 3 are conducted by that POS component. The steps are provided in chronological order descending the page.

Steps 301-4 are conducted prior to the execution of step 306. In step 301, a first software stack for a first NFC protocol is stored on discrete microcontroller 203. In step 302, a second software stack for a second NFC protocol is stored on discrete microcontroller 203. Although these two steps are shown as sequential in chronological order, these steps can be conducted in any order so long as they are completed before step 306 and can involve the software stacks mentioned above. At least one of the software stacks can be provided by an authorized payment processing standardization entity and can be loaded into discrete microcontroller 302 in an unmodified original form. Prior or subsequent to the execution of steps 301 and 302, a step 303 of instantiating an operating system for the POS system can be executed on applications microprocessor 204. The operating system can be an Android Operating System or equivalent. The operating system can be used to instantiate a main register application for the POS system that is used by a merchant to interact with the POS system. The operating system can also be used to instantiate supporting applications for the POS system such as a loyalty point tracker, merchant payroll application, and other applications that increase the functionality of the device. The operating system can also be used to instantiate services for the operating system such as in step 304 when the operating system is used to instantiate a master NFC service on the applications microprocessor.

The master NFC service that is instantiated in step 304 can be instantiated by loading the service from firmware on the point of sale device. The master NFC service could be an additional service that is programmed into the applications microprocessor by a POS manufacture after the applications microprocessor was purchased. The master NFC service could be configured to render discrete microcontroller 203 transparent to the operating system on applications processor 204. This approach allows the secure processor to be the first device to receive payment data from the NFC front end in case the applications processor is compromised while at the same time requiring minimum changes to an applications processor architecture that is designed to connect directly to an NFC controller and front end. The master NFC service could communicate with the operating system's NFC service and hide the complexities of interfacing with multiple NFC protocols from the operating system. The operating system's NFC service may be modified slightly in order to communicate with the master NFC service.

The master NFC service could receive requests from applications on the applications processor via the built in NFC service of the operating system to alter the NFC protocol currently being used to communicate on the POS device. For example, an application on the POS system could be triggered by a user which required communication with an NFC tag such as a loyalty tracking system or some other application. The request could be used by the operating system to change the protocol being instantiated by the secure microcontroller. Prior to the NFC front end digitizing an NFC communication signal as in step 305, the master NFC service could execute a step 306 of selecting a software stack to instantiate on the discrete microcontroller. The digitized NFC signal could then be selectively processed using either the protocol provided by the first software stack as in step 307 or the second software stack as in step 308 depending upon which software stack was instantiated on discrete microcontroller. Furthermore, the master NFC service could be configured to time multiplex the two protocols by repeating step 306 and alternating between the two stacks in accordance with a predetermined time interval.

Figure 4:
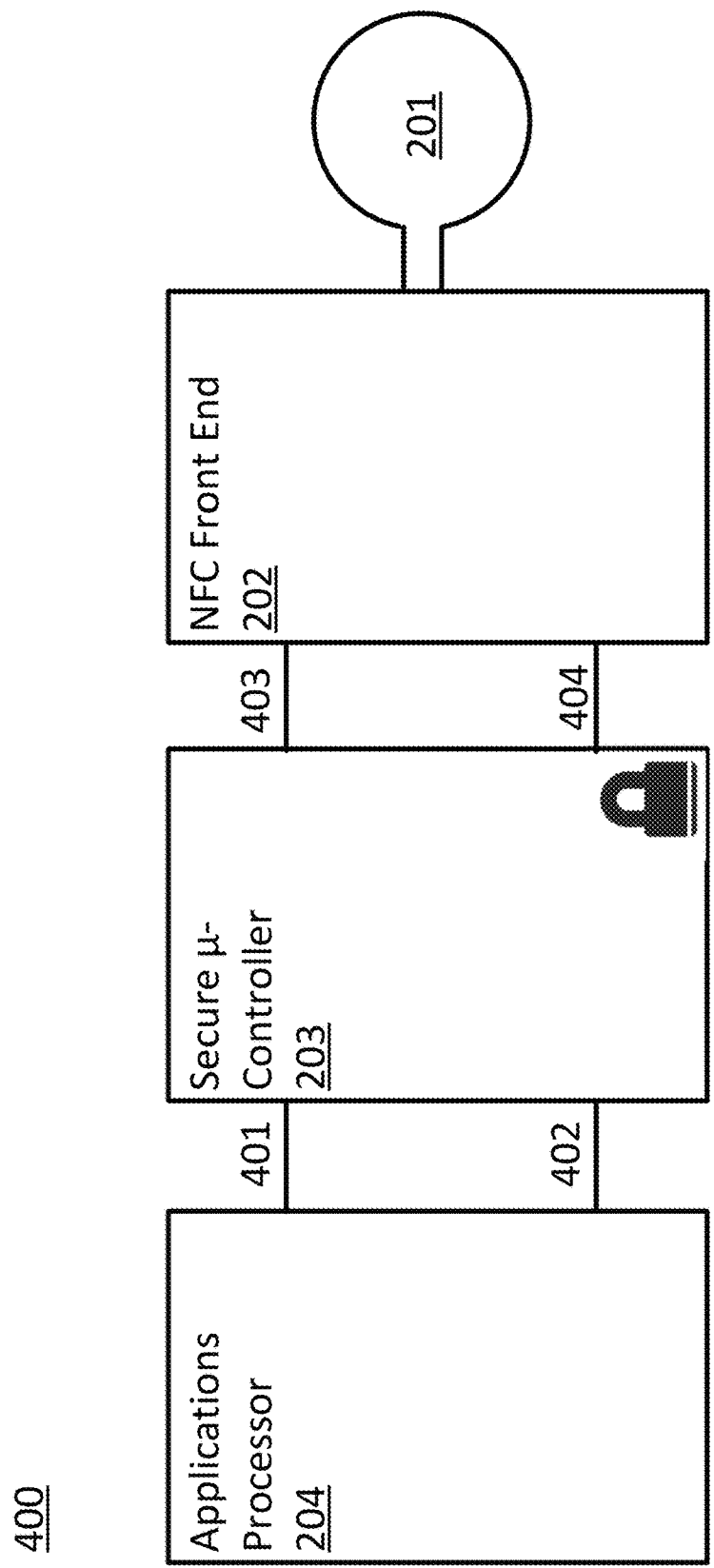
FIG. 4 illustrates a block diagram of a set of components in a POS device that uses a single NFC front end for two incompatible NFC protocols with an emphasis on the physical connections between the components.

The switching mechanism used to transition the POS system between different modes and the manner in which the NFC communication service can render the discrete microcontroller transparent to the operating system can be described with reference to FIGS. 4-8. The elements of block diagram 400 in FIG. 4 are similar to those of block diagram 200 in FIG. 2 and like components are labeled using the same reference numbers. However, block diagram differs as to the illustrated connections between the components. Again, the connections can be implemented by buses, interprocessor lines, cables, and traces on a printed circuit board. In particular, line 401 could be a GPIO bus, line 402 could be a USB, line 403 could be a data bus, and line 404 could be an SPIO bus. The connections will be referred to during the discussion of the ladder diagrams on FIGS. 5-8. In FIGS. 5-8, the first NFC protocols could be the EMV Co L1 protocol and the second NFC protocol could be the NFC Forum Reader/Writer protocol.

A POS system in accordance with the approaches disclosed herein can be programmed to implement many potential varieties for how a mode control switch is initiated. For example, mode control could be initiated on the applications processor side of the POS terminal via a request for NFC processing by an application instantiated by the operating system. As another example, mode control could be initiated on the NFC Front End or discrete microcontroller side in response to detecting information associated with a given protocol in an incoming NFC signal. If the NFC front end or discrete microcontroller detected payment information in an incoming NFC signal, the POS system could immediately switch to a payment processing mode. If any software stack on the discrete microcontroller detected a failed communication, the POS terminal could automatically switch to a different mode to retry the communication with a different protocol. As another example, the POS system could be configured to switch into a time multiplexing mode control state where the NFC front end was continually transitioned between modes with different associated NFC communication protocols to detect if a communication via that particular NFC communication protocol was currently required. Furthermore, the POS systems can utilize different varieties for mode switching based on whether they are transitioning into or out of a given mode. For example, one mode could be favored such that the associated NFC protocol was always allowed to finish before switching out of the mode, and alternative protocols would always be immediately interrupted when switching into the mode. The POS systems could be configured to favor a payment processing mode and its associated payment processing protocol over other modes. As another example, the POS system could be in a payment processing mode by default and only transition out of that mode temporarily when a request to do so was received.

Figure 5:
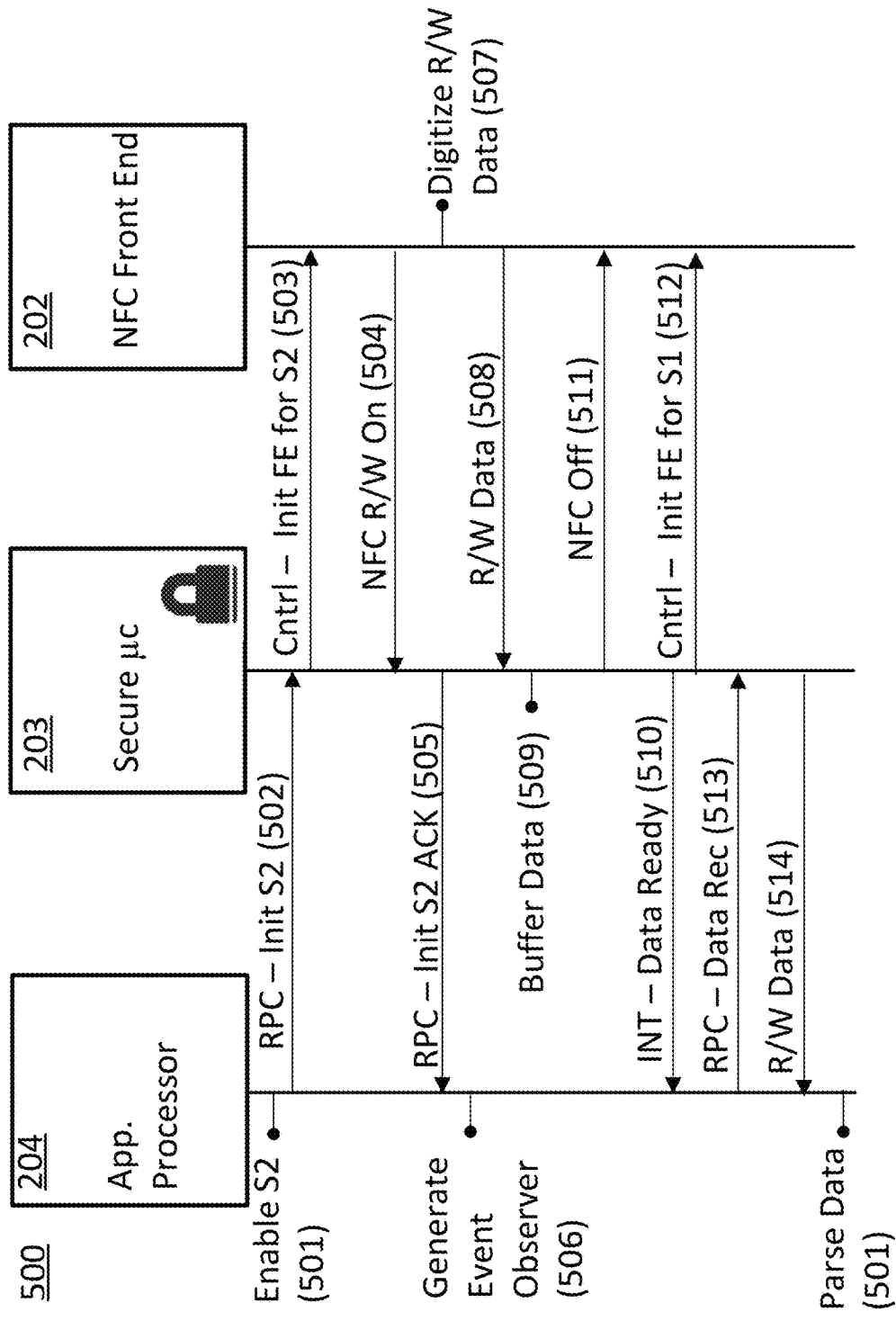
FIG. 5 illustrates a ladder diagram for a set of methods executed by the components of FIG. 4 in which an NFC Forum Reader/Writer protocol is used to obtain data from an external device.

FIG. 5 includes a ladder diagram 500 for a method of controlling the switch over between different modes in a POS system. The two modes are associated with two different software stacks for two different NFC protocols. In this example, the first NFC protocol could be a payment processing protocol and the second NFC protocol could be an NFC Form Reader/Writer protocol. At the top of ladder diagram 500 the device is operating in a payment processing mode with a first software stack instantiated on discrete microcontroller 203. Ladder diagram 500 begins with step 501 of enabling a second software stack via an application on application processor 204. The application can be a loyalty program application running on applications processor 204 that is requesting information from a user's store card with an integrated NFC tag. In step 502, the applications processor sends this update to the discrete microcontroller using a master communication service on applications processor 204. The master communication service could be the only system on applications processor 204 that directly communicates with discrete microcontroller 203. The master communication service triggers a remote procedure call (RPC) to tell discrete microcontroller 203 to instantiate the second software stack for a second NFC protocol. The remote procedure call can be sent on USB line 402. Discrete microcontroller 203 can then conduct a step 503 in which a signal is sent to NFC front end 202 to initialize the front end for the second NFC protocol. NFC front end 202 could then send an acknowledgement to discrete microcontroller 203 in a step 504 to confirm that the front end is configured for the second protocol. Discrete microcontroller 203 could then send a response to the remote procedure call in a step 505 to inform applications processor 204 that the front end is initialized for the second protocol. Applications processor 204 could then generate an event observer in a step 506 to await a signal that the data from the second protocol is available.

After the front end is initialized it could begin to receive data via the NFC antenna and digitize data received in accordance with the Reader/Writer protocol in a step 507. The digitized data could then be transferred to the discrete microcontroller 203 in a step 508. The data could then be buffered on discrete microcontroller 203 in a step 509. Discrete microcontroller 203 could then send an interrupt to applications processor 204 to indicate that the data was ready as in step 510. The interrupt could be sent on GPIO bus 401 and could be detected by the event observe generated in step 506. Discrete microcontroller 203 could also send an optional signal to the NFC front end to power down the antenna and front end in a step 511 to save power. Alternatively, discrete microcontroller 203 could send a signal to the NFC front end to initialize for operation with the first protocol in a step 512. This step could be used in a situation in which the POS terminal was configured to operate in the first mode by default.

The data from the second operating mode could ultimately be delivered to applications processor 204 via a second remote procedure call using the master communication service to request the data from discrete microcontroller 203 in a step 513. The second remote procedure call could originate with the NFC service of the operating system of applications processor 204. The master communication service would issue this request after processing the interrupt informing the service that the data was available in step 510. The data could be returned in a step 514. Finally, the data could be parsed and broadcast to any applications that had registered with the operating system of applications processor 204 to receive the data in a step 515. In a specific approach, the same application that lead to the execution of step 501 could be an application that was registered to receive the data. Finally, step 512 of reinitializing the front end for the first protocol could be conducted at a later time after the antenna had been off for a certain amount of time such that both steps 511 and 512 were executed. Step 512 could also be accompanied by discrete microcontroller 203 reinstantiating the first software stack.

Figure 6:
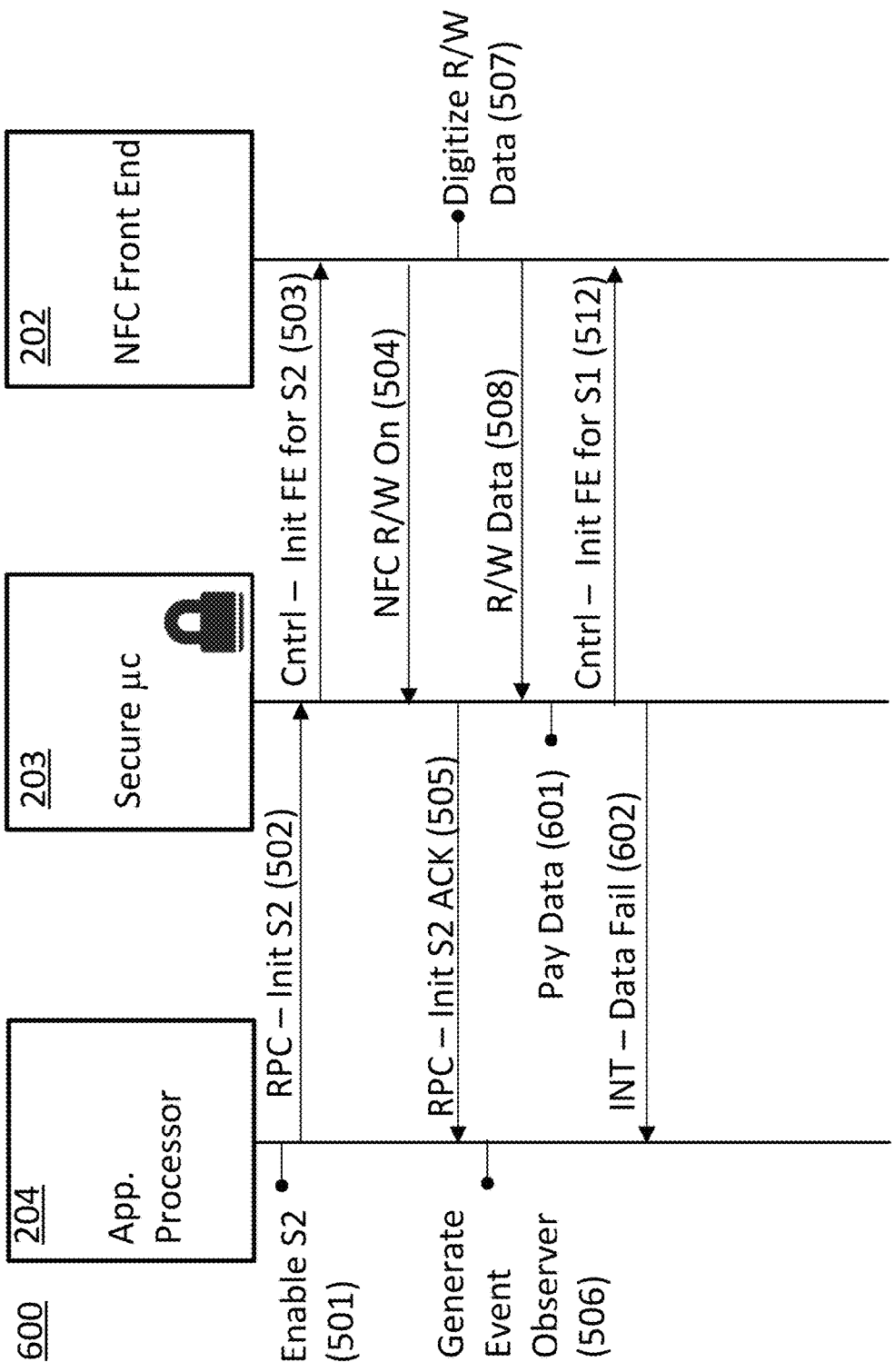
FIG. 6 illustrates a ladder diagram for a set of methods executed by the components of FIG. 4 in which an NFC Forum Reader/Writer protocol is interrupted by the detection of payment data.

FIG. 6 includes a ladder diagram 600 for a method of controlling the switch over between different modes in a POS system. Like steps in diagram 600 are labeled with like reference numbers from FIG. 5. Ladder diagram 600 differs it that it illustrates one way in which the POS system can favor a first NFC protocol over a second NFC protocol. For example, the POS system could favor a payment processing NFC protocol over a more basic or unsecure NFC protocol. The timing of the payment processing NFC protocol could be constrained more tightly than the timing of the alternative NFC protocol. In this example, the first NFC protocol could be a payment processing protocol and the second NFC protocol could be an NFC Form Reader/Writer protocol. As with FIG. 5, the request for the second protocol will be acknowledged, and the process will continue all the way through step 508. However, in the illustrated variant, payment data is detected in the data being read by the discrete microcontroller in a step 601. As the processing of payment data is favored, the discrete microcontroller could send a data fail interrupt to applications processor 204 in a step 602. The interrupt could be received by the event observer generated in step 506. Applications processor 204 would then wait until a later time to send another remote procedure call while discrete microcontroller conducted step 512 to allow for processing of the payment data in accordance with the first NFC protocol.

Figure 7:
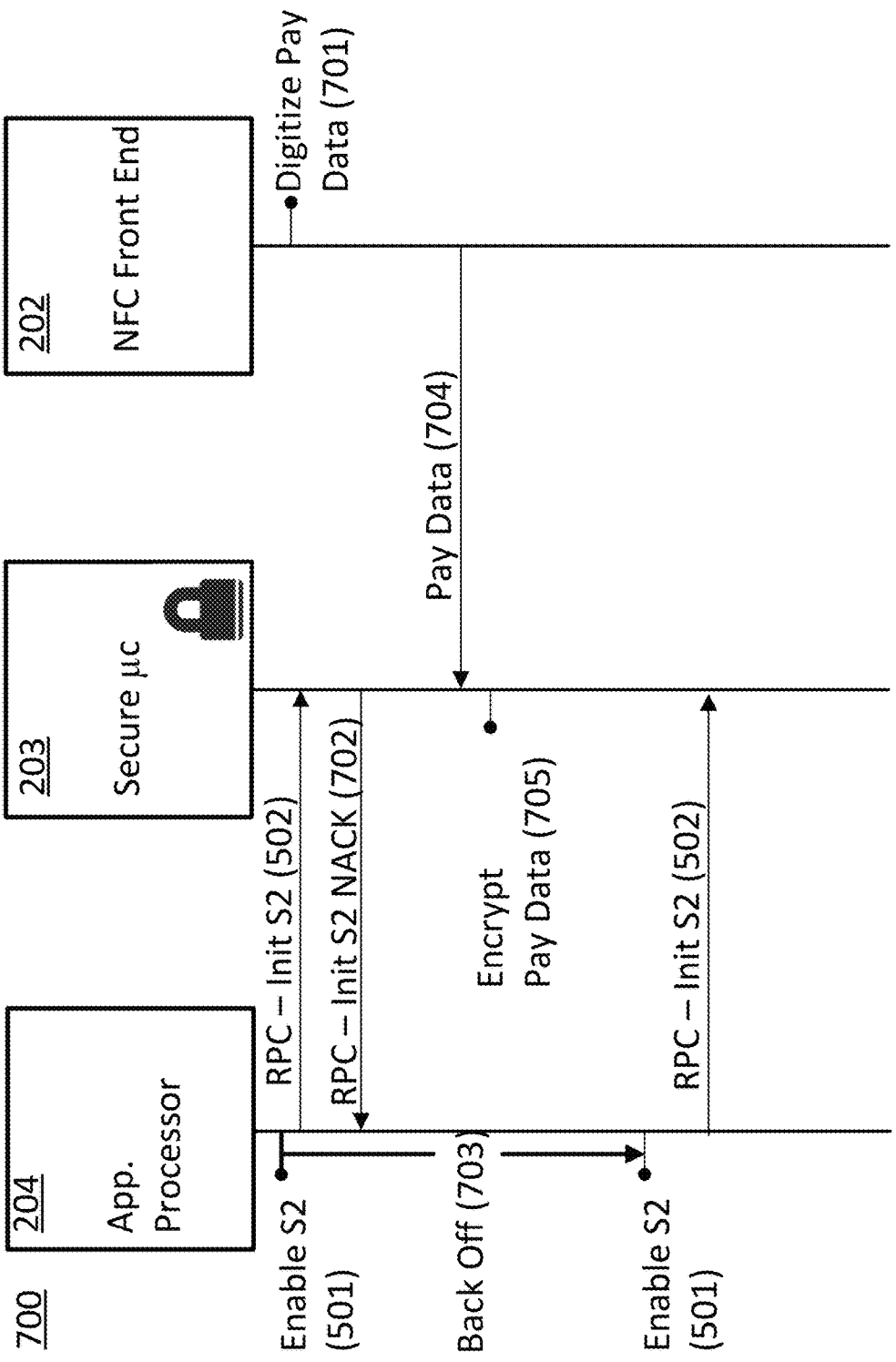
FIG. 7 illustrates a ladder diagram for a set of methods executed by the components of FIG. 4 in which an NFC Forum Reader/Writer protocol is denied due to the ongoing execution of an NFC payment processing protocol.

FIG. 7 includes a ladder diagram 700 for a method of controlling the switch over between different modes in a POS system. Like steps in diagram 700 are labeled with like reference numbers from FIG. 5. Ladder diagram 700 differs it that it illustrates one way in which the POS system can favor a first NFC protocol over a second NFC protocol. For example, the POS system could favor a payment processing NFC protocol over a more basic or unsecure NFC protocol. The timing of the payment processing NFC protocol could be constrained more tightly than the timing of the alternative NFC protocol. In this example, the first NFC protocol could be a payment processing protocol and the second NFC protocol could be an NFC Form Reader/Writer protocol. In the illustrated example, the first NFC protocol is actively conducting a communication session and the front end is digitizing payment data in a step 701. As such, and since the first NFC protocol is favored, the request for initializing the second software stack associated with the second NFC protocol in step 502 will be answered by a negative acknowledgment in step 702. In this variant, the remaining steps of ladder diagram 500 would not be executed and the applications processor would wait until a later time to send another remote procedure call. Specifically, applications processor 204 would wait for a preprogrammed back off period 703 before repeating steps 501 and 502. The back off period could be set proportional to the average time required to conduct a payment processing routine. As such, discrete microcontroller 203 would have time to receive payment information from NFC front end 202 in a step 704, and encrypt the payment information in a step 705, prior to receiving a subsequent remote procedure call from applications processor 204. The back off period could also be configured to increase on further iterations if a subsequent remote procedure call received a negative acknowledgement.

Figure 8:
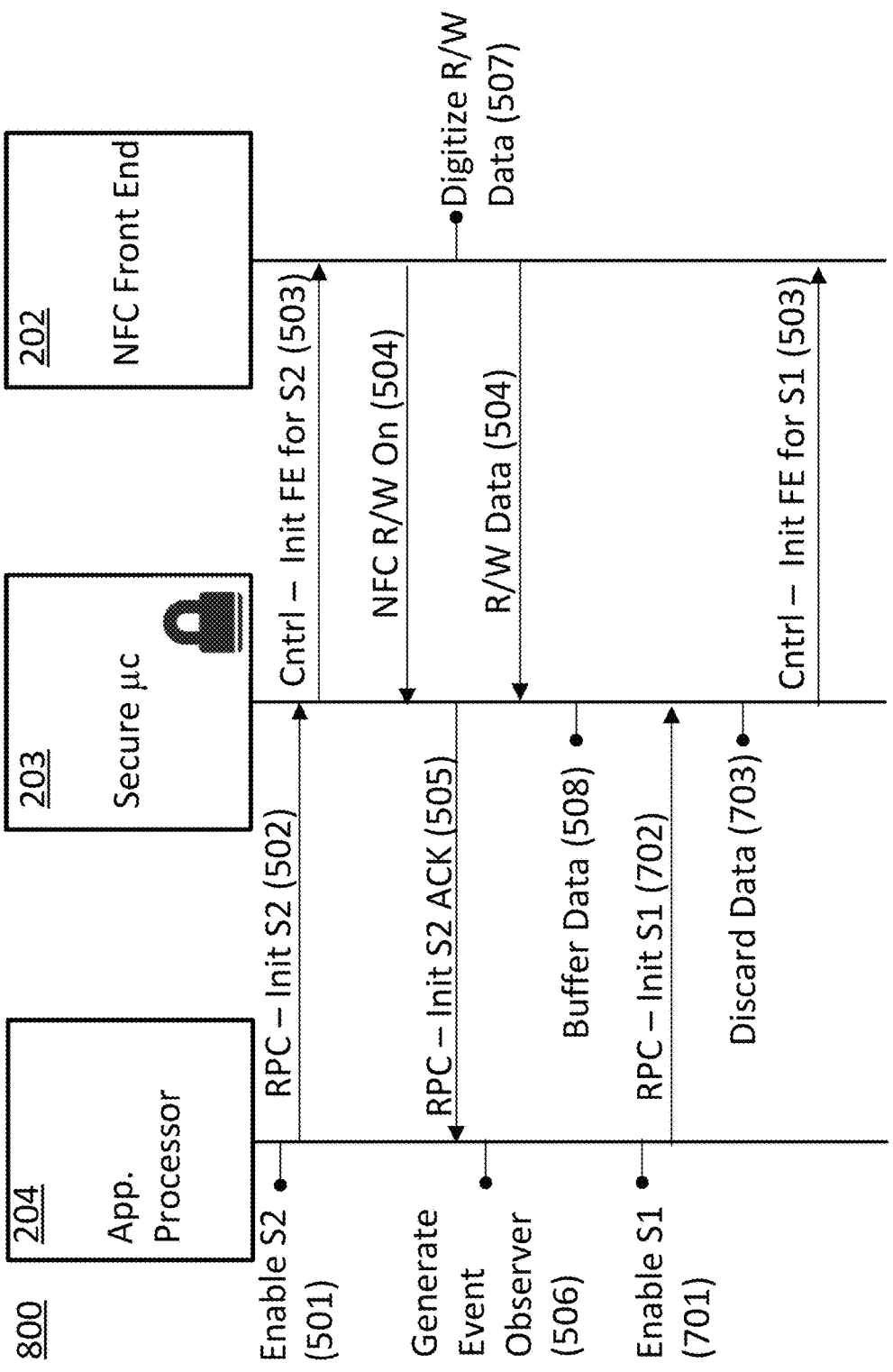
FIG. 8 illustrates a ladder diagram for a set of methods executed by the components of FIG. 4 in which an NFC Forum Reader/Writer protocol is interrupted by the execution of an NFC payment processing protocol.

FIG. 8 includes a ladder diagram 800 for a method of controlling the switch over between different modes in a POS system. Like steps in diagram 800 are labeled with like reference numbers from FIG. 5. Ladder diagram 800 differs it that it illustrates one way in which the POS system can favor a first NFC protocol over a second NFC protocol. For example, the POS system could favor a payment processing NFC protocol over a more basic or unsecure NFC protocol. The timing of the payment processing NFC protocol could be constrained more tightly than the timing of the alternative NFC protocol. In this example, the first NFC protocol could be a payment processing protocol and the second NFC protocol could be an NFC Form Reader/Writer protocol. In ladder diagram 800, steps 501-508 are conducted as in ladder diagram 500. However, in a step 701, an application on applications processor 204 will request the initialization of a first NFC communication mode or data that can only be obtained via said mode. As a result, the master communication service on applications processor 204 may generate a remote procedure call to instantiate the first software stack on discrete microcontroller 203 in a step 702. In response, and because the illustrated approach favors the first mode over the second mode, the data that has been buffered in discrete microcontroller 203 in step 508 is discarded in a step 703. The discrete microcontroller will then also instantiate the first software stack and send a control signal to NFC front end 503 to initialize the front end for the first NFC protocol in a step 704. The event observer 506 can subsequently time out or receive a negative response from discrete microcontroller 203.

The approaches described with reference to FIG. 5-8 can be augmented with various additional aspects. For example, the use of time multiplexing between different modes of operation can be applied to assure that the appropriate protocol is being applied to communicate with alternative devices. Indeed, the default mode of operation for the device could involve an interleaved operation of the different NFC protocols on the device. In these situations, each stack on the discrete microcontroller would run for a specific time slot and then turns off to handover the control to another other stack. If one of the stacks was a payment processing protocol, this could increase the latency, but the merchant experience would be seamless. Also, if any communication between NFC front end and an external device fails, a different protocol can be selected at random or based on any information that was obtained during the failed communication, to complete the communication session with the external device. Any of the control signals described in the ladder diagrams can be sent to the NFC front end on SPIO bus 404 and data can be sent between the two blocks on data bus 403. Any of the interrupts sent from discrete microcontroller 203 to applications processor 204 in the ladder diagrams could be sent on GPIO bus 401 and any data sent between the two blocks can be sent on USB 402.

The specific example of a dual-use NFC front end that is capable of being used to process NFC tags in an NFC read/write mode and also to process payments using the EMVCo L1 standard is used throughout this disclosure as a non-limiting example of the approaches that are disclosed herein. However, the approaches disclosed herein can be utilized to make use of the same NFC front end for multiple communications protocols. Furthermore, the approaches disclosed herein can be utilized for any kind of short range wireless communications technology and radio frequency identification (RFID) communication protocols including ISO/IEC 14443, JIS-X 6319-4, ISO/IEC 18092, EMVCo specifications, any NFC Forum specification (e.g. NFC-A, NFC-B, NFC-F), and any contactless card technology specification generally.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device or a network accessible memory. Although examples in the disclosure were generally directed to a device configured to operate with two different protocols, the approaches could can be directed to a device configured to operate with any number of different protocols so long as the NFC front end could be tuned to receive electromagnetic signals in accordance with the OSI physical level of that protocol. These and other modifications and variations to the present invention may be practiced by those skilled in the art, without departing from the scope of the present invention, which is more particularly set forth in the appended claims.

What is claimed is:

1. A point of sale system comprising:
a near field communication front end, communicatively coupled to an antenna, for digitizing a near field communication signal received on the antenna;
a discrete microcontroller: (i) communicatively coupled with the near field communication front end; (ii) storing a first software stack for a first near field communication protocol; and (iii) storing a second software stack for a second near field communication protocol; and
an applications microprocessor: (i) communicatively coupled with the discrete microcontroller; (ii) instantiating an operating system for the point of sale system; and (iii) instantiating a master NFC service;
wherein the discrete microcontroller is programmed to, selectively and in response to the master NFC service, instantiate: (i) the first software stack exclusive to the second software stack to process the digitized near field communication signal; and (ii) the second software stack exclusive to the first software stack to process the digitized near field communication signal;
wherein the first and second software stacks are independent; and wherein the first near field communication protocol and the second near field communication protocol are different and incompatible.

2. The point of sale system of claim 1, wherein:
the first software stack and the second software stack are stored in a nonvolatile memory on the discrete microcontroller;
the first software stack is for a near field communication tag read/write protocol;
the second software stack is for a payment processing protocol; and
the discrete microcontroller stores a set of encryption keys for the point of sale system.

3. The point of sale system of claim 2, further comprising:
an analog to digital converter on the near field communication front end that is communicatively coupled to the antenna, and that produces the digitized near field communication signal;
a first interprocessor line that communicatively couples the applications microprocessor and the discrete microcontroller; and
a second interprocessor line that communicatively couples the applications microprocessor and the discrete microcontroller;
wherein the discrete microcontroller buffers the digitized near field communication signal in a buffer;
wherein the master NFC service controls all communication on the first interprocessor line and monitors the second interprocessor line;
wherein the second interprocessor line caries an interrupt signal from the discrete microcontroller to the applications microprocessor; and
wherein the master NFC service requests the digitized near field communication signal from the buffer after receiving the interrupt signal.

4. The point of sale system of claim 2, wherein:
the second software stack is for the EMVCo level 1 payment card protocol; and
the point of sale system is an EMV compliant system.

5. The point of sale system of claim 2, wherein:
the discrete microcontroller includes a secure processor;
the near field communication front end is communicatively coupled with the discrete microcontroller via a trace on a printed circuit board;
wherein the applications microprocessor and the discrete microcontroller are discrete devices on the printed circuit board; and
wherein the discrete microcontroller is covered by a tamper mesh.

6. A method for operating a point of sale system comprising:
storing a first software stack for a first near field communication protocol on a discrete microcontroller;
storing a second software stack for a second near field communication protocol on the discrete microcontroller;
instantiating an operating system for the point of sale system on an applications microprocessor;
instantiating a master near field communication (NFC) service on the applications microprocessor;
digitizing a near field communication signal using a near field communication front end; and
selectively processing, on the discrete microcontroller and as selected by the master NFC service, the digitized near field communication signal with one and only one of the first software stack and the second software stack;
wherein the operating system controls the near field communication front end solely via the master NFC service; and
wherein the first near field communication protocol and the second near field communication protocol are different and incompatible.

7. The method of claim 6, wherein:
the first near field communication protocol is a near field communication Forum Read/Write protocol; and
the second near field communication protocol is a near field communication payment processing protocol.

8. The method of claim 7, further comprising:
obtaining payment information from the digitized near field communication signal using the second software stack and the discrete microcontroller; and
encrypting the payment information using the discrete microcontroller;
wherein the discrete microcontroller includes a secure processor.

9. The method of claim 7, further comprising:
instantiating the first software stack; and
transmitting a request to instantiate the second software stack from the master NFC service to the discrete microcontroller;
wherein the first software stack is stored in a nonvolatile memory on the discrete microcontroller; and
wherein the second software stack is stored in the nonvolatile memory.

10. The method of claim 6, further comprising:
buffering the digitized near field communication signal on the discrete microcontroller when the first software stack is instantiated on the discrete microcontroller to form buffered data;
obtaining payment information from the digitized near field communication signal on the discrete microcontroller when the first software stack is instantiated on the discrete microcontroller; and
encrypting the payment information using the discrete microcontroller.

11. The method of claim 10, further comprising:
transmitting a remote procedure call for the first near field communication protocol from a near field communication (NFC) service of the operating system to the discrete microcontroller via the master NFC service;
determining, after receiving the remote procedure call on the discrete microcontroller, that the second near field communication protocol is currently executing; and
returning, in response to determining that the second near field communication protocol is currently executing, a negative acknowledgement to the remote procedure call from the discrete microcontroller via the master NFC service.

12. The method of claim 10, further comprising:
transmitting a remote procedure call for the first near field communication protocol from a near field communication (NFC) service of the operating system to the discrete microcontroller via the master NFC service;
instantiating, after receiving the remote procedure call on the discrete microcontroller, the first software stack on the discrete microcontroller; and
returning a positive acknowledgement to the remote procedure call from the discrete microcontroller via the master NFC service.

13. The method of claim 12, further comprising:
generating an event listener on the operating system after receiving the positive acknowledgement to the remote procedure call;
receiving an interrupt from the discrete microcontroller using the master NFC service and the event listener; and
transmitting, after receiving the interrupt, a second remote procedure call for the buffered data from the NFC service of the operating system to the discrete microcontroller via the master NFC service.

14. The method of claim 13, further comprising:
parsing the buffered data using the operating system upon receiving the buffered data via the master NFC service to form parsed data; and
broadcasting the parsed data to a set of applications registered with the operating system to receive the parsed data.

15. The method of claim 13, wherein:
the remote procedure call and the second remote procedure call are sent on a first interprocessor line that communicatively couples the applications microprocessor and the discrete microcontroller; and
the interrupt is received on a second interprocessor line that communicatively couples the applications microprocessor and the discrete microcontroller.

16. The method of claim 15, wherein:
the first interprocessor line and the second interprocessor line are each selected from the group consisting of: a universal asynchronous receiver/transmitter line, a universal serial bus line, and a serial peripheral bus line;
the first software stack and the second software stack are stored in a nonvolatile memory on the discrete microcontroller;
the second software stack is for the EMVCo level 1 payment card protocol; and
the point of sale system is an EMV compliant system.

17. The method of claim 6, further comprising:
time multiplexing the first software stack and the second software stack using the master NFC service;
wherein the discrete microcontroller includes a secure processor; and
wherein the first near field communication protocol is an NFC Forum Read/Write protocol; and
wherein the second software stack is for the EMVCo level 1 payment card protocol.

18. A point of sale system comprising:
a near field communication front end communicatively coupled to an antenna;
a discrete microcontroller: (i) communicatively coupled with the near field communication front end; (ii) storing a first software stack for a first near field communication protocol; and (iii) storing a second software stack for a second near field communication protocol;
an applications microprocessor communicatively coupled with the discrete microcontroller;
a first computer readable medium on the discrete microcontroller storing instructions to process a digitized near field communication signal from the near field communication front end with the first software stack; and
a second computer readable medium on the applications microprocessor storing instructions to:
instantiate an operating system for the point of sale system;
instantiate a master near field communication (NFC) service; and
transmit a remote procedure call from the master NFC service to the discrete microcontroller to switch between the first software stack and the second software stack.

19. The point of sale system of claim 18, wherein:
the first software stack is the NFC Forum Read/Write protocol;
the second software stack is the EMVCo level 1 payment card protocol; and
the first computer readable medium on the discrete microcontroller further stores instructions to:
obtain payment information from the near field communication front end using the second software stack; and
encrypt the payment information.

20. The point of sale system of claim 19, wherein the first computer readable medium on the discrete microcontroller further stores instructions to:
determine, after receiving the remote procedure call, that the second near field communication protocol is not currently executing;
return, upon determining that the second near field communication protocol is not currently executing, a positive acknowledgement to the remote procedure call via the master NFC service; and
buffer a digitized near field communication signal from the near field communication front end in a buffer to generate buffered data.

21. The point of sale system of claim 20, the second computer readable medium on the applications microprocessor further storing instructions to:

generate an event listener on the operating system after receiving the positive acknowledgement on the applications microprocessor;

receive an interrupt from the discrete microcontroller using the event listener; and transmit a second remote procedure call, after receiving the interrupt, to fetch the buffered data from the buffer.

22. The point of sale system of claim 21, the second computer readable medium on the applications microprocessor further storing instructions to:

parse the buffered data from the buffer using the master NFC service to generate parsed data; and broadcast the parsed data to a set of applications registered with the operating system to receive the parsed data.

* * * * *